(12) United States Patent
Pellettiere

(10) Patent No.: US 8,181,292 B1
(45) Date of Patent: May 22, 2012

(54) SEAT CUSHION

(75) Inventor: Joseph A. Pellettiere, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 304 days.

(21) Appl. No.: 12/559,602

(22) Filed: Sep. 15, 2009

(51) Int. Cl.
*B64D 25/04* (2006.01)
*B60N 2/42* (2006.01)
*A47C 27/10* (2006.01)
*B64D 25/10* (2006.01)

(52) U.S. Cl. ............. 5/654; 5/655.3; 5/713; 297/216.1; 244/122 R

(58) Field of Classification Search ........... 5/654, 655.3, 5/713; 244/122 R, 122 A; 297/216.1, DIG. 3
See application file for complete search history.

(56) References Cited

U.S. PATENT DOCUMENTS

| | | | |
|---|---|---|---|
| 4,915,124 A * | 4/1990 | Sember, III | 137/223 |
| 5,427,331 A | 6/1995 | Stroud | |
| 5,558,398 A * | 9/1996 | Santos | 297/284.3 |
| 6,014,784 A | 1/2000 | Taylor et al. | |
| 6,203,105 B1 * | 3/2001 | Rhodes, Jr. | 297/284.6 |
| 6,422,087 B1 * | 7/2002 | Potter | 73/731 |
| 6,668,405 B1 * | 12/2003 | Kohlman | 5/654 |
| 6,938,290 B2 * | 9/2005 | McKinney et al. | 5/654 |

* cited by examiner

*Primary Examiner* — Michael Trettel
(74) *Attorney, Agent, or Firm* — AFMCLO/JAZ; Rebecca Greendyke

(57) ABSTRACT

A semi-active seat cushion is disclosed that comprises a plurality of chambers for containing a pressurized fluid, wherein each chamber is connected to at least one other chamber by an orifice that provides a fluid connection; a supply conduit for supplying a pressurized fluid to each of the plurality of chambers; and at least one relief valve that permits rapid and controlled deflation of the plurality of chambers.

10 Claims, 2 Drawing Sheets

SEAT CUSHION

RIGHTS OF THE GOVERNMENT

The inventions described herein may be manufactured and used by or for the Government of the United States for all governmental purposes without the payment of any royalty.

BACKGROUND OF THE INVENTION

Seat cushions currently used in automotive, aircraft, and military vehicles are generally passive in nature. That is, they rely on the use of rate sensitive foams to cushion occupants and absorb energy from impacts, and from the catapult phase of an ejection in the case of aircraft. While these foams can reduce the probability of injury by slightly lowering the spinal loads that an occupant is exposed to, they have several limitations. First, they are very sensitive to environmental conditions such as temperature, humidity, and age. Each of these conditions reduces the effectiveness of the foams. As such, their performance can never be known or predicted accurately. In addition, their passive nature prevents them from adjusting to the contours of each individual or adjusting to a particular impact event.

With the increased tempo of military operations, including combat missions that can extend to 40 hours or more, such limitations can reduce air crew comfort and effectiveness. Moreover, current ejection seats create discomfort, soreness, and numbness. They also increase overall operator fatigue, particularly during extended missions. These conditions can adversely affect operator effectiveness.

Another limitation of passive cushions is that they only can absorb a certain amount of energy in a particular way and therefore cannot be designed to provide optimal support and energy absorption for different conditions such as different sized occupants and different impact levels. Typical designs of passive cushions are directed to mid-sized males. If a heavier person now uses the system, they may pre-compress the cushion beyond the point at which it has been designed to absorb any additional impact energy. Conversely, if a smaller person uses the system, they may not sufficiently load the system during impact to absorb the energy. These are inherent limitations found in current designs that use passive cushions and foams.

SUMMARY OF THE INVENTION

The seat cushions disclosed herein use a novel technique to dynamically control the stiffness and impact properties of a seat cushion during routine use and during impact or ejection. The seat cushions are actively controlled and they can self-contour to provide an optimal seat interface for crew members of different size while also providing optimal safety properties during high energy events such as impacts and ejections.

These seat cushions demonstrate the benefits of active control versus passive control for reducing physical fatigue and increasing impact safety. With active control, the limitations of a fixed cushion thickness and contour can be mitigated through application of real time control of the material properties. This control is especially useful in absorbing energy during impacts, ejections, and other sudden, higher energy events.

Another advantage of this semi-active system is its ability to absorb the maximum amount of energy for a diverse population of users and events. Thus, its safety margin is higher than passive cushions and other currently available cushions.

In addition, because the properties of the seat cushion can be adjusted continually, the influence of environmental factors can be minimized so that they do not degrade the performance and energy absorption characteristics of the seat cushions.

A semi-active seat cushion according to one embodiment comprises: a plurality of chambers for containing a pressurized fluid, wherein each chamber is connected to at least one other chamber by an orifice that provides a fluid connection; a supply conduit for supplying a pressurized fluid to each of the plurality of chambers; and at least one relief valve that permits rapid and controlled deflation of the plurality of chambers.

A method of absorbing energy in a seat cushion comprises the steps of: supplying a pressurized fluid to each of a plurality of chambers of a seat cushion, wherein the plurality of chambers are in fluid communication with one another; sensing an event; and releasing the pressurized fluid from each of the plurality of chambers of the seat cushion in a controlled manner in response to the sensed event to absorb the optimal amount of energy, thereby reducing the amount of energy that is received by an occupant of the seat cushion.

A semi-active seat cushion system comprises: a pressurized fluid source; a plurality of chambers for containing a pressurized fluid, wherein each chamber is connected to at least one other chamber by an orifice that provides a fluid connection; a supply conduit for supplying a pressurized fluid to each of the plurality of chambers; a relief valve that permits rapid and controlled deflation of the plurality of chambers; and a controller connected to the relief valve to open the relief valve and control the rate of release of pressurized fluid from the plurality of chambers to optimize the amount of energy that is absorbed by the seat cushion.

DETAILED DESCRIPTION

The disclosed seat cushion uses a semi-active technology. Modeling work has demonstrated the utility of algorithms that can be used to optimize the mechanical properties of seat cushions during a high energy event such as an ejection or an impact by controlling the release of pressurized fluid in the seat cushions.

Figure 1:
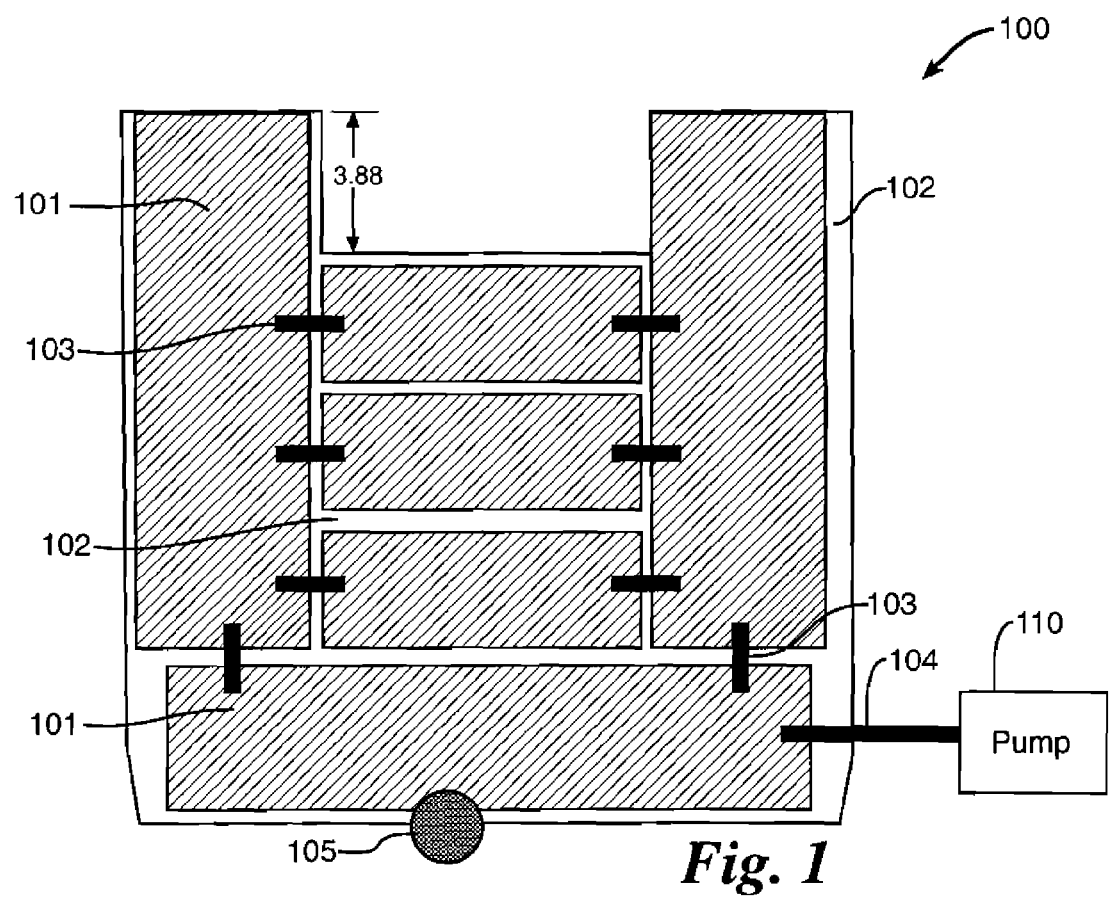
FIG. 1 is a top, cross-sectional view of a seat cushion according to one embodiment.
Figure 2:
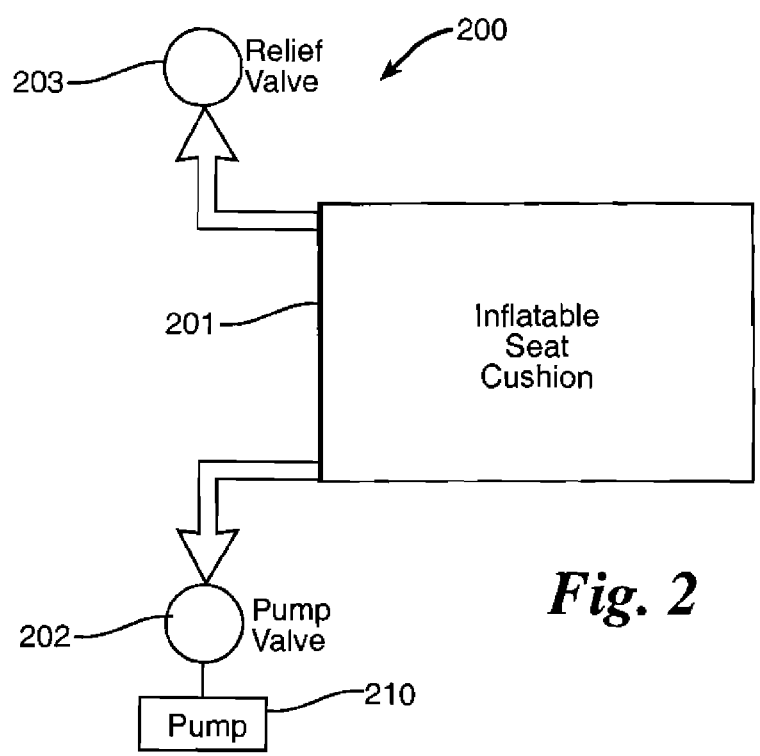
FIG. 2 is a diagram of a seat cushion system.
Figure 3:
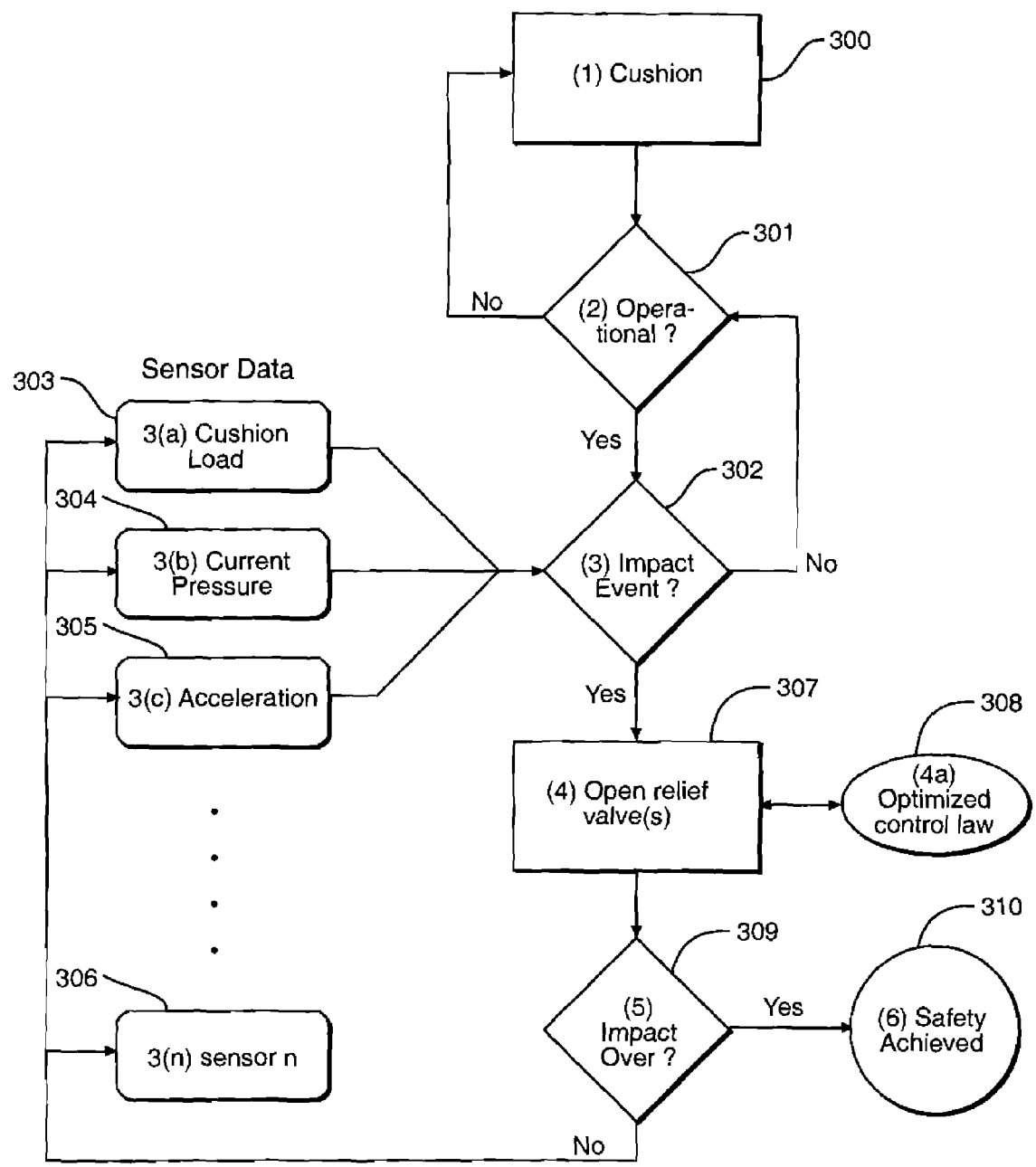
FIG. 3 is a flowchart of a seat cushion program.

In one embodiment, a seat cushion 100 includes a plurality of chambers 101. Each chamber 101 may be the same size and configuration or the chambers 101 may be different sizes and configurations, as shown in FIG. 1. Each chamber 101 is wrapped inside a layer of comfort foam 102. The foam layer 102 can smooth the surface of the seat cushion 100 between the air chambers 101 to eliminate gaps that may be created by different size chambers 101. The foam layer 102 also provides a backup source of cushioning should a leak develop in one of the chambers 101. A sheepskin cover or similar material (not shown) is placed on top of the chambers 101 and the foam layer 102. In one embodiment, each chamber 101 is approximately two inches in total thickness including the foam layer 102. Persons skilled in the art will understand that the thickness of the foam layer 102 and each chamber 101 can be varied, as desired, to satisfy different operational requirements and conditions. Moreover, materials other than comfort foam may be used.

The chambers 101 are connected to one another by one or more orifices 103. The orifices 103 permit fluid such as air to flow between the chambers 101. The orifices 103 enable each chamber 101 to contain fluid at a different pressure, for example, based on different forces received from different occupants of the seat cushion 100, or from differences resulting from the chambers 101 being filled from a single pressurized fluid source. The capability of chambers 101 to contain fluids at different pressures enables different regions of the body to be supported with differing amounts of force by the seat cushion 100. This differential pressure distribution capability also enables the seat cushion 100 to contour to a diverse population including a wide range of anthropometry and different genders. The level of pressure in each chamber 101 can be adjusted to the occupant and can vary with time. The aperture in each orifice 103 can be the same or it may be different and may be sized to provide semi-active cushioning for ejections, impacts, and other similar events. The orifices 103 allow pressurized fluid to flow between the chambers 101 so that the pressure in each chamber 101 can change. The orifices 103 also allow fluid to flow from the chambers 101 and the seat cushion 100 during a high energy event such as an impact, so that the seat cushion 100 can absorb the impact energy.

Pressurized fluid such as air is supplied to the chambers 101 by a supply conduit 104 that is connected to a source of pressurized fluid such as a pump 110. By adjusting the pressure of the fluid supplied to the seat cushion 100 via the supply conduit 104, the pressure in each chamber 101 can be adjusted. This adjustment permits an optimal pressure to be maintained during flight and operation while also permitting adjustment of the air pressure in the seat cushion 100, as necessary, to respond to different conditions such as acceleration and the like. The number, size, and configuration of each chamber 101, the foam layer 102, and each orifice 103 can be varied to suit different requirements and operating conditions. For example, the number of chambers 101 can be increased and the chambers 101 can be placed in more than one layer in the seat cushion 100. The chambers 101 can be arranged in a serpentine configuration or other configuration to facilitate movement and release of fluid between the chambers 101 and from the seat cushion 100 via a relief valve 105, described below. The pump 110 can provide pressurized air or other pressurized fluid to the seat cushion 100 through more than one supply conduit 104. The pump 110 and its power source can either be self contained within the cushion, or the pump 110 can draw external power, air, or fluid pressure from the aircraft, vehicle, or other system in which it is installed.

The seat cushion 100 also includes at least one relief valve 105. The relief valve 105 is connected to one or more of the chambers 101 to permit rapid and controlled deflation of the chambers 101 of the seat cushion 100. In the case of an ejection, the relief valve 105 can release pressurized fluid from each chamber 101 in a controlled manner to absorb the energy from the ejection and prevent or reduce the likelihood of injury to the pilot or operator. The relief valve 105 can be tuned to allow the seat cushion 100 to be quickly deflated in a controlled manner that optimizes the amount of energy that is absorbed by the seat cushion 100. For example, the orifice size and opening speed of the relief valve 105 can be tuned to the acceleration pulse that is expected depending upon the type of impact that is anticipated. Upon impact, the relief valve 105 opens to permit the cushion 100 and the chambers 101 to deflate in a preferred manner. The relief valve 105 operates in cooperation with the orifices 103 to release pressurized fluid from the chambers 101. This controlled deflation allows energy from the impact or ejection event to be absorbed in an optimal manner, thereby decreasing the impulse to, and force received by, the occupant, and lowering the risk of a spinal injury. More than one relief valve 105 may be used to release pressurized fluid from the chambers 101 of the cushion 100, as desired and thereby to adjust the means by which pressurized fluid is released from the chambers 101, and alter the energy that is absorbed by the cushion 100 during an event such as an ejection or impact.

In another embodiment, a seat cushion system 200 includes an inflatable seat cushion 201, a pump 210, a pump valve 202, and at least one relief valve 203. The pump 210 provides pressurized fluid to chambers of the seat cushion 201. The pump may be a pneumatic cylinder or similar device. The relief valve 203 permits pressurized fluid contained in the chambers of the seat cushion 201 to be released on a controlled manner. In operation, the seat cushion 201 is inflated. The pump valve 202 is opened to permit pressurized fluid such as air from the pump 210 to fill the chambers (not shown) of the seat cushion 201. When the seat cushion 201 and its chambers are filled to the desired pressure(s), the pump valve 202 is closed. During a high energy event such as an impact or ejection, the relief valve 203 is opened to permit the pressurized fluid in each chamber 101 to escape from the seat cushion 201 in a controlled manner. By controlling this release, the seat cushion 201 can absorb the maximum energy possible from the impact or ejection, thereby protecting the occupant to the maximum extent possible. The rapid pressure relief of the cushion 201 by the relief valve 203 only occurs in the event of an impact or ejection. To determine when such relief is necessary, the seat cushion system 200 can use data from a variety of existing crash/impact sensors in the vehicle to sense a high energy event and to trigger the depressurization of the cushion 201. Alternatively, the seat cushion system 200 can use an internal custom developed crash sensor, use a mechanical threshold switch, or have defined failure points developed into the system. Algorithms can be developed for each impact application to determine the optimum operation of the relief valve 203. Inputs to each algorithm would include the size of the occupant, the instantaneous pressure, the impact level and the desired safety level. The output would be a control law that governs the opening and closing the relief valve 203 as well as design guidance on the size of the relief valve 203. Moreover, more than one relief valve 203 may be used in the seat cushion system 200 to control the release of pressurized fluid during an impact or ejection.

The relief valve 203 can be a mechanical or an electronic valve. If it is a mechanical valve, the valve size and opening speed can be selected to provide the desired control parameters for absorbing the maximum amount of energy from the impact or ejection. The size of the relief valve 203 will be determined by the volume of fluid expected to be present in the cushion 201 and the amount of time necessary to deflate the cushion 201. To achieve the optimum safety level, more than one relief valve 203 may be necessary. If the relief valve 203 is electronic, its operation is controlled by software and algorithms to provide the optimal safety and to absorb the maximum amount of energy. This derivation can be custom-developed depending on the volume of air in the cushion 201, the impact profile, and the safety margin.

In an alternate embodiment, the pump valve 202 can be a check valve or similar valve that is designed to open upon a high energy event such as an impact or ejection to release pressurized fluid in the seat cushion 201. When an event such as an impact or ejection occurs, and the pressure in the seat cushion 201 exceeds the limits of the pump valve 202, the pump valve 202 opens and the seat cushion 201 is deflated, thereby absorbing some of the impact energy. The pump valve 202 can be designed to open and release pressurized fluid from the seat cushion 201 in a controlled manner that maximizes the energy absorbed by the seat cushion 201. The pump valve 202 is typically controlled for slower inflation and deflation during normal operations. When an impact event is sensed, the pump valve 202 can be opened according to the control laws to deflate the cushion 201. In this embodiment, the pump valve 202 can be either the sole means of deflation, or it can be coupled with a dedicated relief valve 203, or multiple relief valves 203. The developed software and control algorithms will account for either method.

In a further embodiment, a control program for the seat cushion operates in the following manner. In step (1) 300, the program runs initialization routines to determine if a seat cushion is present. If a seat cushion is not detected, the program does not run any further routines, but rather continues to run a routine to determine if the seat cushion is present. If a seat cushion is detected in step (1) 300, the program runs a routine to determine if the seat cushion is operational in step (2) 301. If the seat cushion is not in an operational mode, the program can perform various diagnostic routines to identify the source of the problem that prevents the seat cushion from being operational and inform an operator or maintenance person of the problem. If the seat cushion is determined to be operational in step (2) 301, the program then runs various routines in step (3) 302 to determine if an impact event or other high energy event has occurred. The routines that are run in step (3) 302 receive sensor data from one or more sensors in steps (3a-3n) 303-306. The sensors can include a load sensor in step (3a) 303, a current pressure sensor in step (3b) 304, an acceleration sensor in step 3(c) 305, and any additional sensors n in step 3(n) 306. The program can receive data from other sensors, if desired, to determine if a high energy event such as an impact or an ejection has occurred. If the program does not detect an impact event from the sensor data in step (3) 302, the program continues to monitor whether the seat cushion is operational, as in step (2) 301.

If the program receives sensor data indicating that an impact event has occurred in step (3) 302, the program opens one or more relief valves to release pressurized fluid from the seat cushion in step (4) 307. The program controls opening of the relief valve according to an established optimized control law in step (4a) 308 to ensure that the optimal amount of energy is absorbed. This process in step (4a) is determined through an analytical optimization process taking into consideration cushion properties, impact profile, and safety level. The optimized control law is determined during cushion development and it is programmed as part of the controller for the cushion operation program. The program continues to monitor and control deflation of the seat cushion in step (5) 309 until the event is over. To determine if an impact, ejection, or other high energy event has ended in step (5) 309, the program continues to receive sensor data from one or more sensors. If the sensor data received in step (5) 309 indicates that the event is not over, the program continues to receive and evaluate sensor data at step (3) 302 and control opening of the relief valves in step (4) 307 according to the optimized control law in step (4a) 308. The program continues to receive and evaluate sensor data until it is determined that the event is over at step (5) 309. The controller may also store the sensor and valve data to aid in a post-event analysis. Once the program determines that the event is over at step (5) 309, the program determines whether optimum safety was achieved in step (6) 310. This can be determined by evaluating the sensor data compared to the pressure released in step (4) 307 via the optimized control law to determine whether the optimum amount of energy from the event was absorbed by the cushion.

The foregoing disclosure has been presented for purposes of illustration and description and is not intended to be exhaustive or to limit the invention to the various embodiments and forms disclosed herein. Persons skilled in the art will realize and appreciate that many modifications and variations are possible in light of the above teaching. For example, persons skilled in the art will appreciate that many pressurized fluid mediums besides air can be used to fill a seat cushion and to absorb energy during an ejection or impact. Moreover, the size and configuration of the seat cushion and chambers can be varied. The disclosed embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A method of absorbing energy in a seat cushion, comprising the steps of:
    supplying a pressurized fluid to each of a plurality of chambers of a seat cushion, wherein the plurality of chambers are in fluid communication with one another;
    sensing whether the seat cushion is operational;
    receiving sensor data to determine whether an impact event has occurred; and
    opening one or more relief valves to release pressurized fluid from each of the plurality of chambers of the seat cushion in a controlled manner according to an optimized control law to absorb the optimal amount of energy.

2. The method of claim 1, further comprising the step of receiving sensor data to determine whether the impact event has ended.

3. The method of claim 1, wherein the step of receiving sensor data to determine whether an impact event has occurred comprises receiving data from one or more cushion load, current pressure, acceleration, or other sensors.

4. The method of claim 1, wherein the step of opening one or more relief valves to release pressurized fluid includes the step of opening a mechanical or an electronic relief valve.

5. The method of claim 1, further comprising the step of comparing and evaluating sensor and valve data to provide a post-event analysis to determine whether optimum safety was achieved.

6. The method of claim 1, wherein the step of releasing the pressurized fluid includes the step of opening a pump valve and/or a relief valve.

7. A semi-active seat cushion system, comprising:
    a pressurized fluid source;
    a plurality of chambers for containing pressurized fluid, wherein each chamber is connected to at least one other chamber by an orifice that permits the pressurized fluid to flow between the chambers;
    a supply conduit for supplying a pressurized fluid to each of the plurality of chambers;
    at least one relief valve that permits rapid and controlled deflation of the plurality of chambers; and
    a controller connected to the relief valve to open the relief valve and control the rate of release of pressurized fluid from the plurality of chambers to optimize the amount of energy that is absorbed by the seat cushion.

8. The semi-active seat cushion system of claim 7, wherein the controller comprises a sensing system to determine the current pressure, a sensor to discriminate between events, and a program to optimize the safety level.

9. The semi-active seat cushion system of claim 7, wherein the at least one relief valve comprises a mechanical or an electronic valve.

10. The semi-active seat cushion system of claim 7, further comprising a pump valve that is connected to the pressurized fluid source and that can be opened to release pressurized fluid from one or more of the plurality of chambers.

* * * * *